US012006469B2

(12) United States Patent
Southwell et al.

(10) Patent No.: US 12,006,469 B2
(45) Date of Patent: Jun. 11, 2024

(54) TUBE COATING WITH POLAR SURFACE TREATED SILICA-BASED NANOPARTICLES TO PREVENT BUILD-UP OF SOLID SULFUR

(71) Applicant: NISSAN CHEMICAL AMERICA CORPORATION, Houston, TX (US)

(72) Inventors: John Edmond Southwell, Glen Ellyn, IL (US); Samuel James Maguire-Boyle, Spring, TX (US)

(73) Assignee: Nissan Chemical America Corporation, Houston, TX (US)

( * ) Notice: Subject to any disclaimer, the term of this patent is extended or adjusted under 35 U.S.C. 154(b) by 0 days.

(21) Appl. No.: 18/007,646

(22) PCT Filed: Jun. 1, 2021

(86) PCT No.: PCT/US2021/035224
§ 371 (c)(1),
(2) Date: Dec. 1, 2022

(87) PCT Pub. No.: WO2021/247554
PCT Pub. Date: Dec. 9, 2021

(65) Prior Publication Data
US 2023/0227711 A1 Jul. 20, 2023

Related U.S. Application Data

(60) Provisional application No. 63/033,558, filed on Jun. 2, 2020, provisional application No. 63/033,555, filed on Jun. 2, 2020, provisional application No. 63/067,719, filed on Aug. 19, 2020, provisional application No. 63/067,715, filed on Aug. 19, 2020, provisional application No. 63/067,729, filed on Aug. 19, 2020, provisional application No. 63/067,718, filed on Aug. 19, 2020, provisional application No. 63/067,703, filed on Aug. 19, 2020, provisional application No. 63/067,706, filed on Aug. 19, 2020.

(51) Int. Cl.
*C09K 8/532* (2006.01)
*F16L 58/14* (2006.01)

(52) U.S. Cl.
CPC .............. *C09K 8/532* (2013.01); *F16L 58/14* (2013.01); *C09K 2208/10* (2013.01)

(58) Field of Classification Search
CPC .. C09K 8/532; C09K 2208/10; Y10S 507/932
See application file for complete search history.

(56) References Cited

U.S. PATENT DOCUMENTS

| | | |
|---|---|---|
| 3,331,657 A | 7/1967 | Peter et al. |
| 4,543,193 A | 9/1985 | Peter et al. |
| 4,728,447 A | 3/1988 | Labat |
| 5,223,160 A * | 6/1993 | Emmons ............. C23F 15/00 507/90 |
| 10,472,556 B2 | 11/2019 | Hurtevent et al. |
| 11,059,079 B1 | 7/2021 | Allred, Jr. |
| 11,077,474 B1 | 8/2021 | Allred, Jr. |
| 2016/0279595 A1 | 9/2016 | Tsapatsis |
| 2017/0349810 A1 | 12/2017 | Hurtevent et al. |
| 2018/0166681 A1 | 6/2018 | Archer et al. |
| 2022/0220362 A1 | 7/2022 | Ohori et al. |

FOREIGN PATENT DOCUMENTS

| | | |
|---|---|---|
| CN | 103214631 | 7/2013 |
| CN | 104449631 | 2/2016 |
| CN | 107857775 | 3/2018 |
| CN | 107488445 | 11/2019 |
| GB | 2 411 681 | 9/2005 |
| WO | 2008/057783 | 5/2008 |
| WO | 2018/191144 | 10/2018 |
| WO | WO2019/199289 A1 | 10/2019 |

OTHER PUBLICATIONS

Faeze Tari, et al., "Modified and systematic synthesis of zinc oxide-silica composite nanoparticles with optimum surface area as a proper $H_2S$ sorbent", Canadian Journal of Chemical Engineering, vol. 95, No. 4, Apr. 2017, pp. 737-743 (7 pages).
International Search Report for PCT/US2021/035224 dated Sep. 29, 2021, 4 pages.
Written Opinion of the ISA for PCT/US2021/035224 dated Sep. 29, 2021, 6 pages.
E. Jorjani et al. "Challenges with elemental sulfur removal during the leaching of copper and zinc sulfides, and from the residues; a review," Hydrometallurgy, vol. 171, XP085111747, Jun. 7, 2017, pp. 333-343.
ISR and Written Opinion issued Sep. 16, 2021 in PCT Application No. PCT/US2021/035214, 15 pages.
ISR and Written Opinion issued Sep. 29, 2021 in PCT Application No. PCT/US2021/035236, 14 pages.
ISR and Written Opinion issued Sep. 21, 2021 in PCT Application No. PCT/US2021/035243, 14 pages.
ISR and Written Opinion issued Sep. 15, 2021 in PCT Application No. PCT/US2021/035250, 13 pages.
ISR and Written Opinion issued Sep. 30, 2021 in PCT Application No. PCT/US2021/035252, 14 pages.
U.S. Appl. No. 18/007,574, filed Dec. 1, 2022, Southwell et al., related application.

* cited by examiner

*Primary Examiner* — Aiqun Li
(74) *Attorney, Agent, or Firm* — Nixon & Vanderhye, PC

(57) ABSTRACT

A method to reduce the deposition of solid sulfur (Ss(s)) in a natural gas producing well, is described wherein the inside of the pipes used in the well are coated with a coating comprising polar surface treated nanoparticles. The polar surface treated nanoparticles interact with the sulfur gas and interfere with the deposition of solid sulfur onto the surface of the pipe. The polar surface treated nanoparticles are selected from the group consisting of silica, alumina and silica-aluminate, metal sulfates and metal oxides.

4 Claims, No Drawings

TUBE COATING WITH POLAR SURFACE TREATED SILICA-BASED NANOPARTICLES TO PREVENT BUILD-UP OF SOLID SULFUR

CROSS REFERENCE TO RELATED APPLICATIONS

This application is the U.S. national phase of International Application No. PCT/US2021/035224 filed Jun. 1, 2021 which designated the U.S. and claims priority to U.S. Provisional Application No. 63/033,555, filed Jun. 2, 2020, U.S. Provisional Application No. 63/033,558, filed Jun. 2, 2020, U.S. Provisional Application No. 63/067,703, filed Aug. 19, 2020, U.S. Provisional Application No. 63/067,706, filed Aug. 19, 2020, U.S. Provisional Application No. 63/067,715, filed Aug. 19, 2020, U.S. Provisional Application No. 63/067,718, filed Aug. 19, 2020, U.S. Provisional Application No. 63/067,719, filed Aug. 19, 2020, and U.S. Provisional Application No. 63/067,729, filed Aug. 19, 2020, the entire contents of each of which are incorporated herein by reference.

BACKGROUND OF THE INVENTION

Helium is a chemical element with the symbol He and atomic number 2. It is a colorless, odorless, tasteless, non-toxic, inert, monatomic gas, the first in the noble gas group in the periodic table. Its boiling point is the lowest among all the elements.

Helium is critically important for specialized uses in industrial, scientific, and medical processes and procedures. Liquid helium is used in cryogenics (its largest single use, absorbing about a quarter of production), particularly in the cooling of superconducting magnets, with the main commercial application being in MRI scanners. Helium's other industrial uses—as a pressurizing and purge gas, as a cooling gas used in the manufacture of optical fibers, as a protective atmosphere for arc welding and in processes such as growing crystals to make silicon wafers, account for approximately half of the gas produced. A well-known but minor use is as a lifting gas in balloons and airships.

From the beginning of recovery of helium from underground sources, all commercial helium is recovered from natural gas fields. The range of Helium found in natural gas fields is anywhere from a barely detectable level of about 0.1% to a level of about 10% of natural gas in some fields. A helium content of about 0.3% or more is considered necessary for commercial helium extraction.

In the oil and gas industry, wet gas is often used to describe the raw unprocessed gas, but some gas is 'wetter' than others. Wet gas has higher levels of natural gas liquids (NGLs) and condensates. In a typical natural gas well, in addition to natural gas liquids, there are multiple types of gasses present, such as, but not limited to carbon dioxide ($CO_2$), methane ($CH_4$), nitrogen ($N_2$), hydrogen sulfide ($H_2S$), sulfur ($S_8$) and Helium (He).

If there is a significant amount of butane, ethane, pentane, liquid petroleum/gasoline or other higher hydrocarbons then the gas is termed 'wet'. These are NGLs or condensates. From the standpoint of BTUs, dry gas is below 1050. Wet gas is above 1050 BTUs with anything over 1350 being termed as 'super rich'.

When there is a high level of methane, the gas is considered dry, even if it has just been extracted from the well. Many conventional wells naturally produce dry gas that needs little processing. When we refer to dry gas, we mainly mean methane, which is used to heat homes, cook, and power some vehicles.

All the gases in a natural gas well travel upwards from the reservoir to the surface through a series of connected pipes commonly referred to as the "tubing string".

As the gas rises from the reservoir and travels towards the surface through the tubing string it is a common occurrence that at the point along the wellbore where the temperature and pressure drop in the tubing string, gaseous sulfur ($S_{8(g)}$) begins to precipitate out into solid octasulfur ($S_{8(s)}$). This octasulfur then attaches itself to the inner surface of the pipe and is visible as a yellow solid. Eventually the yellow solid builds up on the pipe surface to a point where the flow of gas through the pipe is impeded causing the production of gas at the well to decrease. With a decrease in gas production comes a decrease in helium production and many times helium is the most valuable gas recovered from the well.

The problem of deposition of solid sulfur on the surfaces of pipes used to harvest natural gas is well known in the industry.

UK Patent Application No. 2411681A, "Method of Reducing Deposition of Elemental Sulfur in a Gas Well", published on Sep. 7, 2005. This patent application describes and claims a method of reducing elemental sulfur deposition in a gas well involves injecting an aqueous solution of a surfactant having a hydrophile-lipophile balance value of at least 8 into the gas well upstream of a location where elemental sulfur precipitates from the produced natural gas. The concentration of the surfactant is such that the solution is above the critical micelle concentration for the aqueous surfactant solution under the thermodynamic conditions prevailing in the wellbore. At least a portion of the precipitated sulfur dissolves in the aqueous surfactant solution.

U.S. Pat. No. 3,331,657, "Method of Preventing the Depositing of Sulfur in the Riser Pipes in Producing Natural Gases Laden with Hydrogen Sulfide and Containing Elemental Sulfur Solution", issued on Jul. 18, 1967. This patent describes and claims in a method of preventing the formation of solid sulfur in a stream of natural gas during upward passage of the same from a subterranean natural gas deposit, said natural gas including $H_2S$, $CO_2$ and elementary sulfur and being initially at an elevated pressure and temperature sufficiently high to maintain said sulfur in solution in said $H_2S$, the step of introducing into said stream of natural gas during upward passage of the same, at a point at which the pressure and temperature of said natural gas stream are still sufficiently high to maintain said sulfur in solution in said $H_2S$, an aqueous solution of the hydroxide of at least one substance selected from the group consisting of alkali metals and ammonia so as to form an aqueous solution of the sulfide of said substance having said sulfur dissolved therein in the form of an alkali metal or ammonium polysulfide.

U.S. Pat. No. 3,393,733, issued Jul. 23, 1968 to Shell Oil Company and is entitled "Method of Producing Wells Without Plugging of Tubing String". This patent claims a method of preventing hydrate formation and sulfur plugging in tubing string of a production well which extends from ground level to an underground producing zone for the production of a sulfur-containing fluid from said Zone, said method comprising: (a) flowing said sulfur-containing fluid from the producing Zone upwardly through said production tubing string; and, (b) injecting into said production tubing string, through an injection tubing string in communication with said production tubing string, at a point where sulfur and hydrate deposition in the tubing string tend to form due to temperature and pressure drop in the tubing string, a hot sulfur-free fluid miscible with sulfur, said fluid being at a temperature above about 100° F. (37.8° C.) and at a pressure sufficient to prevent sulfur precipitation and solidification on the tubing string wall.

U.S. Pat. No. 4,543,193, "Process for Preventing the Precipitation of Elementary Sulphur in Riser Pipes of Probes for Natural Gas", issued on Sep. 24, 1983. This patent describes and claims a process for preventing the precipitation of elementary sulfur from natural gas which may contain hydrogen sulfide and/or carbonic acid together with elementary sulfur during the mining of the gas which comprises dissolving the sulfur in a solvent which is selected from the group consisting of esters of mono- or poly-unsaturated fatty acids; thioethers of said esters or mono- or poly-unsaturated fatty acids; the mixed reaction products of hydrogen sulfide and said esters or mono- or poly-unsaturated fatty acids in the presence of elementary sulfur; and mixtures thereof, said solvent being optionally used in form of a solution wherein said solvent contains 10 to 24 carbon atoms in the fatty acid component and 1 to 22 carbon atoms in the alcohol component.

U.S. Pat. No. 10,472,556 "Nano-inhibitors", issued on Nov. 12, 2019. This patent describes and claims novel hybrid nanoparticles, useful for inhibiting or slowing down the formation of sulfur deposits or minerals in a well during the extraction of gas or oil. Specifically, the nanoparticles each include (i) a polyorganosiloxane (POS) matrix; and, optionally as a coating over a lanthanide oxide core, (iii) at least one polymeric scale inhibitor during the extraction of gas or oil. The invention also relates to the method for obtaining the nano-inhibitors and the application of same.

There are existing coatings which are applied to the inside surfaces of pipes used to harvest natural gas to improve the recovery of the natural gas.

Granted Japanese Patent JP5376524B2 entitled "Nano-composite Coating for Screwed Connections" describes and claims a coating which provides corrosion resistance, wear resistance, and, optionally, lubrication, for deposition on a threaded article is disclosed. The coating comprises a polymer matrix, such as a polyimide, which is modified with small amounts of a fluorine containing polymer modifier, as well as other compounds or additives to improve performance of the coating. Additionally, the coating can further comprise a solid lubricant or an anticorrosion compound dispersed within the polymer matrix.

There are existing coatings containing nanoparticles which are applied to the inside surfaces of pipes used to cool electronics. In the article, "Effect of Nanoparticle Coating on the Performance of a Miniature Loop Heat Pipe for Electronics Cooling Applications", *J. Heat Transfer*. February 2018, 140(2): written by Trijo Tharayil, Lazarus Godson Asirvatham, S. Rajesh, and Somchai Wongwises, 022401 (9 pages), Published Online: Sep. 13, 2017, Paper No: HT-17-1060 https://doi.org/10.1115/1.4037541, the effect of nanoparticle coating on the performance of a miniature loop heat pipe (mLHP) is experimentally investigated for heat inputs of 20-380 W using distilled water as the working fluid. Applications include the coolimg of electronic devices such as circuit breaker in low voltage switch board and insulated gate bipolar transistor. Physical vapor deposition method is used to coat the nanoparticles on the evaporator surface for different coating thicknesses of 100 nm, 200 nm, 300 nm, 400 nm, and 500 nm, respectively. An optimum filling ratio (FR) of 30% is chosen for the analysis. Experimental findings show that the nanoparticle coating gives a remarkable improvement in heat transfer of the heat pipe. An average reduction of 6.7%, 11.9%, 17.2%, and 22.6% in thermal resistance is observed with coating thicknesses of 100 nm, 200 nm, 300 nm, and 400 nm, respectively. Similarly, enhancements in evaporator heat transfer coefficients of 47%, 63.5%, 73.5%, and 86% are noted for the same coating thicknesses, respectively. Evaporator wall temperature decreased by 15.4° C. for 380 W with a coating thickness of 400 mm. The repeatability test ensures the repeatability of experiments and the stability of coatings in the long run.

There are existing nanoparticle coatings that are used to facilitate measuring with a quartz crystal microbalance. See: "Processing and Characterization of Nanoparticle Coatings for Quartz Crystal Microbalance Measurements", authored by Jessica D. Torrey, Teresa L. Kirschling, and Lauren F. Greenlee, J Res Natl Inst Stand Technol, 2015; 120: 1-10, Published online 2015 January 30. doi: 10.6028/jres.120.001. The quartz-crystal microbalance is a sensitive and versatile tool for measuring adsorption of a variety of compounds (e.g., small molecules, polymers, biomolecules, nanoparticles and cells) to surfaces. While the technique has traditionally been used for measuring adsorption to flat surfaces and thin ridged films, it can also be extended to study adsorption to nanoparticle surfaces when the nanoparticles are fixed to the crystal surface. The sensitivity and accuracy of the measurement depend on the users' ability to reproducibly prepare a thin uniform nanoparticle coating. This study evaluated four coating techniques, including spin coating, spray coating, drop casting, and electrophoretic deposition, for two unique particle chemistries [nanoscale zero valent iron (nZVI) and titanium dioxide ($TiO_2$)] to produce uniform and reproducible nanoparticle coatings for real-time quartz-crystal microbalance measurements. Uniform $TiO_2$ coatings were produced from a 50 mg/mL methanol suspension via spin coating. Nanoscale zero-valent iron was best applied by spray coating a low concentration 1.0 mg/mL suspended in methanol. The application of multiple coatings, rather than an increase in the suspension concentration, was the best method to increase the mass of nanoparticles on the crystal surface while maintaining coating uniformity. An upper mass threshold was determined to be approximately 96 $\mu g/cm^2$; above this mass, coatings no longer maintained their uniform rigid characteristic, and a low signal to noise ratio resulted in loss of measurable signal from crystal resonances above the fundamental.

What is needed is a coating for the inside of pipes used to harvest natural gas, where the coating will inhibit the deposition of solid sulfur on the inside of the pipe wall.

SUMMARY OF THE INVENTION

The first aspect of the instant claimed invention is a method to reduce the deposition of solid sulfur ($S_{8(s)}$) in a natural gas producing well, the method comprising the steps of a) Operating a natural gas production field comprising one or more natural gas production wells with each well containing a tubing string of connected pipes that allow gas to travel from a reservoir to the surface, b) Identifying the sections of pipe within the tubing string where there is the buildup of solid sulfur, c) Coating the sections of pipe within the tubing string where there is a buildup of solid sulfur by either
    (i) leaving the sections of pipe in place and applying an inner surface tube coating "in-situ" with a coating comprising polar surface treated silica-based nanoparticles, or (ii) removing those sections of pipe and replacing them with pipe that has been coated on its inner surface with a coating comprising polar surface treated silica-based nanoparticles, d) allowing the sulfur in the natural gas to flow through the tubing string and contacting the coating comprising polar surface treated silica-based nanoparticles with the gaseous sulfur ($S_{8(g)}$) present in the gas resulting in an interaction that causes the reduction of the deposition of solid sulfur ($S_{8(s)}$), wherein said polar surface treated silica-based nanoparticles are selected from the group consisting of silica, alumina, and silica-aluminate.

The second aspect of the instant claimed invention is a method to reduce the deposition of solid sulfur ($S_{8(s)}$) in a natural gas producing well, the method comprising the steps of a) Operating a natural gas production field comprising one or more natural gas production wells with each well containing a tubing string of connected pipes that allow gas to travel from a reservoir to the surface, b) Identifying the sections of pipe within the tubing string where there is the buildup of solid sulfur, c) Coating the sections of pipe within the tubing string where there is a buildup of solid sulfur by either
  (i) leaving the sections of pipe in place and applying an inner surface tube coating "in-situ" with a coating comprising polar surface treated silica-based nanoparticles, or
  (ii) removing those sections of pipe and replacing them with pipe that has been coated on its inner surface with a coating comprising polar surface treated silica-based nanoparticles, d) allowing the sulfur in the natural gas to flow through the tubing string and contacting the coating comprising polar surface treated nanoparticles with the gaseous sulfur ($S_{8(g)}$) present in the gas resulting in an interaction that causes the reduction of the deposition of solid sulfur ($S_{8(s)}$), wherein said polar surface treated nanoparticles are selected from the group consisting of metal sulfates and metal oxides.

The third aspect of the instant claimed invention is the method of the first aspect of the instant claimed invention in which the coating of the sections of pipe is accomplished by leaving the sections of pipe in place and applying an inner surface tube coating "in-situ" with a coating comprising polar surface treated silica-based nanoparticles.

The fourth aspect of the instant claimed invention is the method of the first aspect of the instant claimed invention in which the coating of the sections of pipe is accomplished by removing those sections of pipe and replacing them with pipe that has been coated on its inner surface with a coating comprising polar surface treated nanoparticles.

The fifth aspect of the instant claimed invention is the method of the second aspect of the instant claimed invention in which the coating of the sections of pipe is accomplished by leaving the sections of pipe in place and applying an inner surface tube coating "in-situ" with a coating comprising polar surface treated silica-based nanoparticles.

The sixth aspect of the instant claimed invention is the method of the second aspect of the instant claimed invention in which the coating of the sections of pipe is accomplished by removing those sections of pipe and replacing them with pipe that has been coated on its inner surface with a coating comprising polar surface treated nanoparticles.

DETAILED DESCRIPTION OF THE INVENTION

The first aspect of the instant claimed invention is a method to reduce the deposition of solid sulfur ($S_{8(s)}$) in a natural gas producing well, the method comprising the steps of a) Operating a natural gas production field comprising one or more natural gas production wells with each well containing a tubing string of connected pipes that allow gas to travel from a reservoir to the surface, b) Identifying the sections of pipe within the tubing string where there is the buildup of solid sulfur, c) Coating the sections of pipe within the tubing string where there is a buildup of solid sulfur by either
  (i) leaving the sections of pipe in place and applying an inner surface tube coating "in-situ" with a coating comprising polar surface treated silica-based nanoparticles, or
  (ii) removing those sections of pipe and replacing them with pipe that has been coated on its inner surface with a coating comprising polar surface treated silica-based nanoparticles, d) allowing the sulfur in the natural gas to flow through the tubing string and contacting the coating comprising polar surface treated silica-based nanoparticles with the gaseous sulfur ($S_{8(g)}$) present in the gas resulting in an interaction that causes the reduction of the deposition of solid sulfur ($S_{8(s)}$), wherein said polar surface treated silica-based nanoparticles are selected from the group consisting of silica, alumina, and silica-aluminate.

When the pipe is coated by sending the coating containing nanoparticles through the pipe, the nanoparticles can be either polar surface treated silica-based nanoparticles or polar surface treated nanoparticles.

This invention describes a method of using polar surface modified silica nanoparticles (P-SiNp)s as a wellbore flowable nanoparticle. The polar surface functionalization discourages wetting of the $S_8$ in the vapor phase onto the surface of the pipe.

The solid polar surface treated silica-based nanoparticles can be comprised of substances including, without limitation, Silica, Silica comprising aluminum, Silica comprising aluminum silicate, metal sulfates and metal oxides.

In an embodiment, the polar surface treated silica-based nanoparticles are selected from the group consisting of silica, alumina, and silica-aluminate. Polar surface modified silica-based nanoparticles where the nanoparticles comprise silica, alumina and/or silica aluminate are selected from the group consisting of alkaline colloidal silica surface-treated with glycidoxypropyl trimethoxysilane, Acidic colloidal silica surface-treated with glycidoxypropyl trimethoxysilane, Alkaline colloidal silica surface-treated with mercaptopropyl trimethoxysilane, Acidic colloidal silica surface-treated with mercaptopropyl trimethoxysilane, Alkaline or acidic colloidal silica surface treated with organosilanes comprising organic moieties having functional groups including: carboxy; aldehyde; alcohol; phenol; benzoyl; ether; glycol; epoxy; oxime; ester; amide; primary/secondary/tertiary amine; nitrile or nitroalkane functionalities; and polymeric non-silane surface treatment embodiments include ethoxylated/polyethoxylated alcohol and ethoxylated/polyethoxylated functionalities comprising polymers and copolymers of polyethylene oxide.

Additional nanoparticles comprising silica, alumina and/or silica aluminate are described in the specification and examples of U.S. Pat. No. 10,557,078, "Brine Resistant Silica Sol", issued on Feb. 11, 2020 to Nissan Chemical America Corporation, which US Patent is incorporated herein by reference in its entirety.

Certain of these polar surface modified silica-based nanoparticles where the nanoparticles comprise silica, alumina and/or silica aluminate are available commercially from Nissan Chemical America Corporation 10333 Richmond Avenue, Suite 1100 Houston, Texas 77042 www.nissanchem-usa.com In an embodiment, polar surface treated nanoparticles are selected from the group consisting of metal sulfates and metal oxides. Metal sulfate and metal oxide polar surface treated nanoparticles are available commercially.

In an embodiment the nanoparticles are added to the gas in the tubing. By being added to a coating mixture and then having that coating mixture be added to the tube.

In an embodiment the nanoparticles are applied to the tubing. By being added to a coating mixture and then having that coating mixture be applied to individual pieces of tubing that are either going to be added to the tubing string or that have already been part of the tubing string and have now been removed for cleaning and application of the nanoparticle containing coating.

The second aspect of the instant claimed invention is a method to reduce the deposition of solid sulfur ($S_{8(s)}$) in a natural gas producing well, the method comprising the steps of a) Operating a natural gas production field comprising one or more natural gas production wells with each well containing a tubing string of connected pipes that allow gas to travel from a reservoir to the surface, b) Identifying the sections of pipe within the tubing string where there is the buildup of solid sulfur, c) Coating the sections of pipe within the tubing string where there is a buildup of solid sulfur by either
   (i) leaving the sections of pipe in place and applying an inner surface tube coating "in-situ" with a coating comprising polar surface treated silica-based nanoparticles, or
   (ii) removing those sections of pipe and replacing them with pipe that has been coated on its inner surface with a coating comprising polar surface treated silica-based nanoparticles, d) allowing the sulfur in the natural gas to flow through the tubing string and contacting the coating comprising polar surface treated nanoparticles with the gaseous sulfur ($S_{8(g)}$) present in the gas resulting in an interaction that causes the reduction of the deposition of solid sulfur ($S_{8(s)}$), wherein said polar surface treated nanoparticles are selected from the group consisting of metal sulfates and metal oxides.

Metal Sulfate nanoparticles and Metal Oxide nanoparticles are known to people of ordinary skill in the art of nanoparticles and are commercially available from Sky-Spring Nanomaterials, Inc. www.ssnano.com In an embodiment, the coating of the sections of pipe is accomplished by removing those sections of pipe and replacing them with pipe that has been coated on its inner surface with a coating comprising polar surface treated nanoparticles.

Known coatings for the inside of pipes used in natural gas production wells include those coatings sold by Shawcor 25 Bethridge Road, Toronto, Ontario M9W 1M7, Canada. Shawcor's internal pipe coating services provide flow efficiency and corrosion protection for natural gas, water, conduction, and production pipelines. From polyurethane to FBE coating, we stand out among internal pipe coating companies with end-to-end solutions. SureFlo™ FEC SureFlo™ FEC is a thin-film epoxy coating applied in natural gas pipelines to smooth the internal pipe surface for improved flow. See www.shawcor.com/pipe-coating-solutions/integrated-solutions/pipe-coating/internal-pipe-coating SureFlo™ Cement Mortar Lining (CML) is a centrifugally applied continuous lining of dense Portland cement mortar with a smooth and uniform finish. This product provides an economical form of internal corrosion and abrasion protection for oilfield tubulars and line pipe.

SureFlo™ FBE is a plant-applied fusion-bonded epoxy lining for steel pipes where smooth surface and maximum flow is required for gas pipeline.

Non-commercial coating binders as carriers for polar surface treated nanoparticles can be prepared via polyurethane, epoxy, polyester, polyamide, acrylic, or alkyd chemistries either in 100% solids UV/EB curable, solvent borne, or latex varieties. Also included are inorganic sol-gel type binder systems based on alkoxides of Silicon, Titanium or Zirconium, or based on metasilicates of Sodium, Potassium, Lithium or Calcium.

The solid polar surface treated silica-based nanoparticles can be mixed in with the coating and then the coating can be applied to the inside of the pipe. Alternatively, the polar surface treated silica-based nanoparticles could be applied to the wet coating after it had been applied to the inside of the pipe and before the coating had dried. This type of application method is an embodiment that ensures that the nanoparticles are located at the surface of the coating, where they can interact with the gaseous sulfur during its attempt to become solid and adhere to the pipe.

Methods of applying solid nanoparticles to a wet coating before the coating dries are known to people of ordinary skill in the art.

Polar surface treated silica-based nanoparticles are created by applying a surface treatment to silica nanoparticles. These surface treatments and the resulting polar surface treated silica-based nanoparticles are well known in the art and are commercially available from Nissan Chemical America Corporation 10333 Richmond Avenue, Suite 1100 Houston, Texas 77042 www.nissanchem-usa.com under different names.

Alternatively fumed silica and fumed alumina are available commercially and at low cost. While not supplied as colloidal dispersions, primary particle sizes in the submicron size range are available and in an embodiment used as a source of polar surface treated nanoparticles.

Fumed silica and fumed alumina are available commercially from Evonik Industries and Cabot Corporation in both surface-treated and non-surface treated varieties.

EXAMPLES

Example 1

Amino treated silica nanoparticles are a silica nanoparticles dispersion, wherein the silica nanoparticle is treated with a polar surface treatment. Compatibility of a polar surface functionalized silica nanoparticle is tested by adding 0.5 g of $S_{8(s)}$) to 40 mL of amino treated silica nanoparticles. The solution is brought to boil and allowed to cool. The sulfur does not dissolve and remains as a froth on top of the solution.

Example 2

Company ONLY is producing He gas from a well in a western state of the United States. The gas stream consists of 70% $CO_2$, 33% $CH_4$, 7% $N_2$, with the remainder being He, heavier natural gasses, $H_2S$, $S_8$, and other trace elements.

Bottom hole temperature (BHT) is 340° F. (~171° C.). At a point along the wellbore gaseous sulfur $S_{8(g)}$) begins to precipitate out into $S_{8(s)}$) also known as "Octasulfur".

The precipitation is occurring on the wellbore sidewalls. The precipitation eventually closes/reduces the ability of the wellbore to produce He.

In previous work Company ONLY has tried to remove octasulfur by pumping commercially available solvents. These attempts proved fruitless as the solvents which are presumably introduced to the wellbore down the back side, evaporated into the gas stream before encountering the sulfur precipitated area.

The well is shut down and a visual inspection shows what parts of the pipes are coated in solid sulfur. Those parts are removed and replaced with sections of pipe where the internal walls of the pipe have been coated with SureFlo™ FEC thin-film epoxy coating and then a layer of polar surface treated silica-based nanoparticles has been applied to the wet coating such that when the coating dried, the top layer is impregnated with polar surface treated silica-based nanoparticles.

The well is opened again and this time it is noted that the buildup of sulfur in the problem area of the pipes is minimal or non-existent. The well is continually operated long past the typical point in time where the well is shut down to allow for cleaning of the pipes.

The experiment is deemed to be a success.

What is claimed is:

1. A method to reduce the deposition of solid sulfur ($S_{8(s)}$) in a natural gas producing well, the method comprising the steps of
    a) Operating a natural gas production field comprising one or more natural gas production wells with each well containing a tubing string of connected pipes that allow gas to travel from a reservoir to the surface,
    b) Identifying the sections of pipe within the tubing string where there is the buildup of solid sulfur,
    c) Coating the sections of pipe within the tubing string where there is a buildup of solid sulfur by either
        (i) leaving the sections of pipe in place and applying an inner surface tube coating "in-situ" with a coating comprising polar surface treated silica-based nanoparticles and a coating binder, or
        (ii) removing those sections of pipe and replacing them with pipe that has been coated on its inner surface with a coating comprising polar surface treated silica-based nanoparticles and a coating binder,
    d) allowing the sulfur in the natural gas to flow through the tubing string and contacting the coating comprising the polar surface treated silica-based nanoparticles and coating binder with the gaseous sulfur ($S_{8(g)}$) present in the gas resulting in an interaction that causes the reduction of the deposition of solid sulfur ($S_{8(s)}$),
    wherein said polar surface treated silica-based nanoparticles are selected from the group consisting of silica-aluminate,
    wherein the coating binder in either (i) or (ii) is chosen from polyurethane, epoxy, polyester, polyamide, acrylic, alkyd, or an inorganic sol-gel type binder system.

2. The method of claim 1 in which the coating of the sections of pipe is accomplished by leaving the sections of pipe in place and applying an inner surface tube coating "in-situ" with the coating comprising the polar surface treated silica-based nanoparticles and coating binder.

3. The method of claim 1, wherein the coating binder in either (i) or (ii) is a polyurethane or epoxy binder.

4. The method of claim 1, wherein step c) comprises coating the sections of pipe within the tubing string with a thin-film epoxy coating and then a layer of polar surface treated silica-based nanoparticles before the thin-film epoxy coating dries.

* * * * *